United States Patent

Steffens, Jr.

[11] Patent Number: 5,641,198
[45] Date of Patent: Jun. 24, 1997

[54] SEAT INTEGRATED VEHICLE OCCUPANT RESTRAINT

[75] Inventor: Charles E. Steffens, Jr., Washington, Mich.

[73] Assignee: TRW Vehicle Safety Systems Inc., Lyndhurst, Ohio

[21] Appl. No.: 382,083

[22] Filed: Feb. 1, 1995

[51] Int. Cl.$^6$ .................................................. B60N 2/42
[52] U.S. Cl. ................ 297/216.13; 297/483; 297/452.18
[58] Field of Search ....................... 297/483, 463.1, 297/464, 468, 471, 473, 474, 452.18, 216.1, 216.13, DIG. 3, 470, 216.14

[56] References Cited

U.S. PATENT DOCUMENTS

| | | | |
|---|---|---|---|
| 1,684,062 | 9/1928 | Leach et al. | 297/452.18 X |
| 3,761,127 | 9/1973 | Giese et al. | 297/216.1 X |
| 3,877,748 | 4/1975 | Eggert | 297/483 X |
| 3,981,520 | 9/1976 | Pulling | 297/216.1 X |
| 4,749,231 | 6/1988 | Cremer et al. | 297/483 X |
| 4,804,226 | 2/1989 | Schmale | 297/483 X |
| 4,993,778 | 2/1991 | Colin et al. | 297/483 X |
| 5,211,694 | 5/1993 | Sakakida et al. | |
| 5,219,202 | 6/1993 | Rink et al. | |
| 5,318,341 | 6/1994 | Griswold et al. | |
| 5,441,332 | 8/1995 | Verellen | 297/483 |
| 5,447,360 | 9/1995 | Hewko et al. | 297/452.18 |

*Primary Examiner*—Milton Nelson, Jr.
*Attorney, Agent, or Firm*—Tarolli, Sundheim, Covell, Tummino & Szabo

[57] ABSTRACT

A vehicle occupant restraint system (10) includes a seat (12) and a length of belt webbing (42) connected with the seat. A belt webbing engaging member (62) on the seat frame (18) engages the belt webbing (42) for transferring forces from the belt webbing to the seat frame. The belt webbing engaging member (62) is mounted on a first one (110) of a plurality of interconnected seat frame members (72, 90, 110, 130, 150, 170). The seat frame members are movable relative to each other to form a truss (70) in response to the application of force from the belt webbing (42) in excess of a predetermined force. The truss (70) resists deformation of the seat frame (18) due to the forces transmitted to the seat frame.

14 Claims, 4 Drawing Sheets

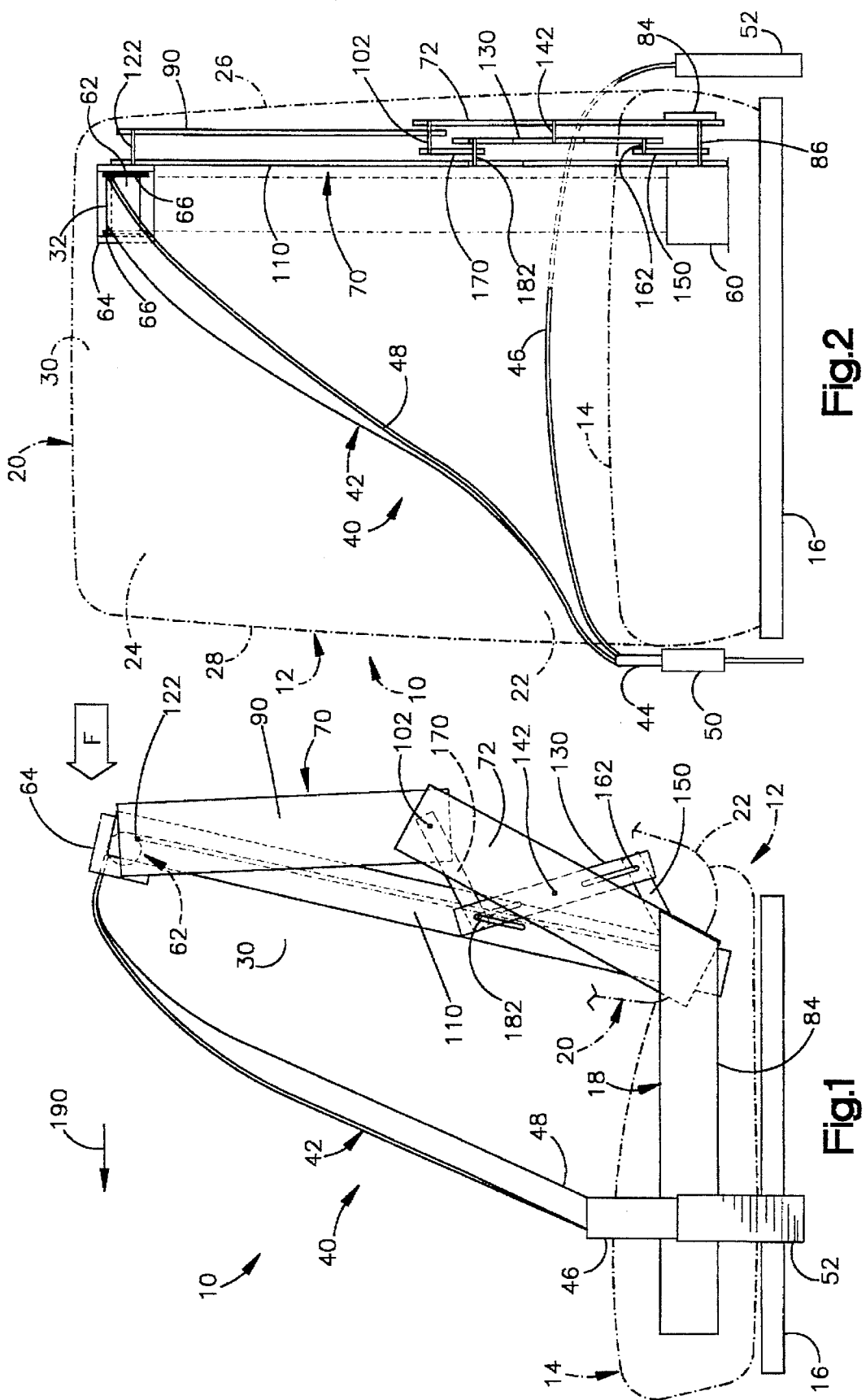

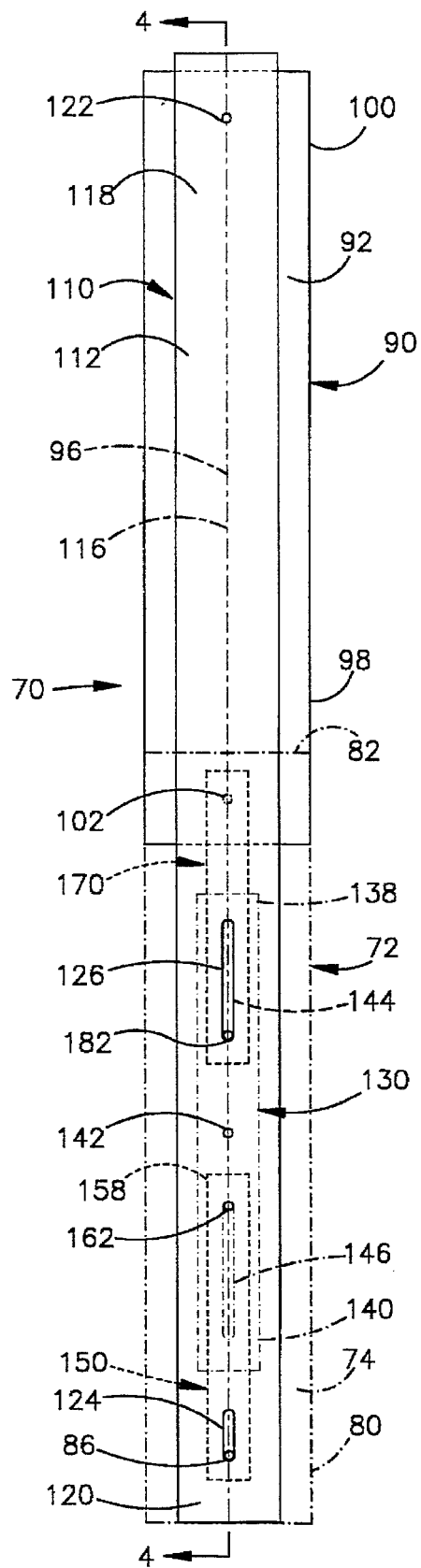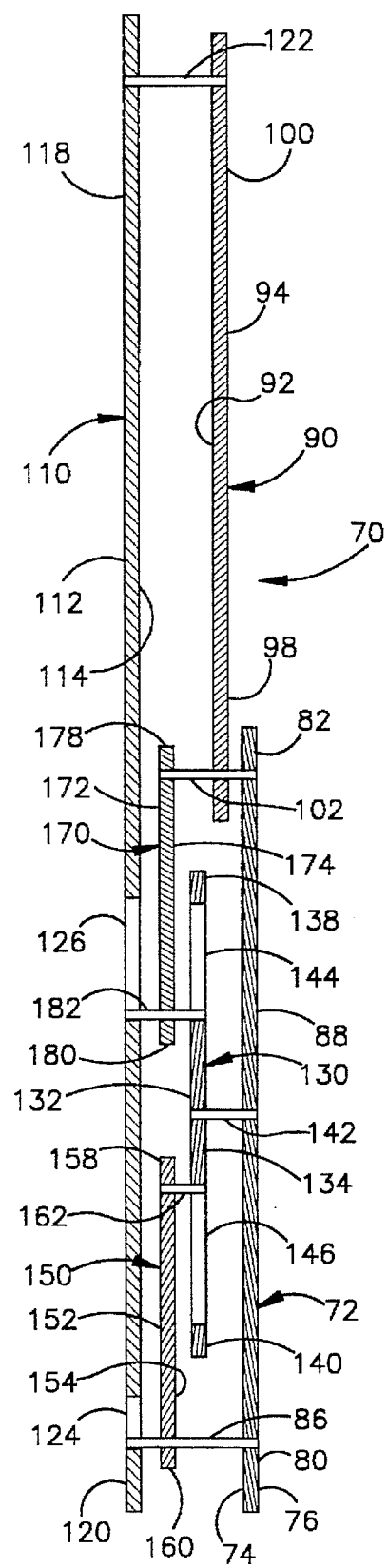

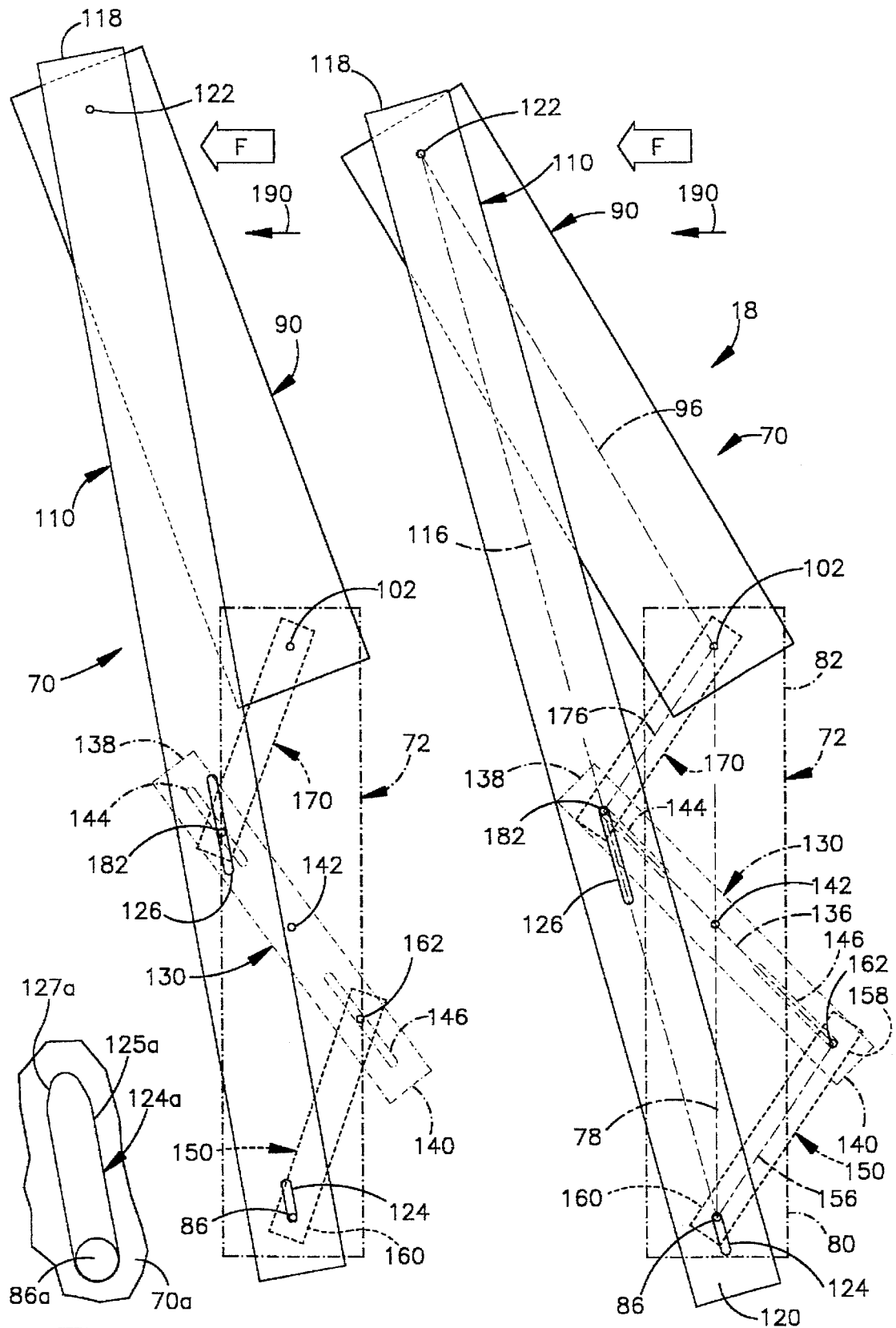

SEAT INTEGRATED VEHICLE OCCUPANT RESTRAINT

BACKGROUND OF THE INVENTION

1. Technical Field

The present invention relates to a vehicle occupant restraint system, and particularly relates to a seat belt system and a vehicle seat in which the seat belt system is integrated.

2. Description of the Prior Art

Seat belt systems are commonly used to restrain vehicle occupants. A typical seat belt system for a vehicle occupant includes a length of belt webbing extensible about the occupant and anchored to the vehicle. In the event of sudden vehicle deceleration such as occurs in a vehicle collision, the occupant initially continues to move forward relative to the vehicle and then is restrained by the belt webbing.

It is known to anchor the length of belt webbing to a vehicle seat in which the occupant is seated, rather than to the vehicle body. The ends of the belt webbing are connected with the frame of the vehicle seat. Forces from the seat belt webbing caused by the vehicle occupant's tensioning of the belt webbing are transferred to the seat frame. The seat frame members thus absorb the sudden and relatively high loads caused by the vehicle occupant's tensioning of the belt webbing during a vehicle collision. It is important, therefore, that the seat frame members not deform under such loads.

SUMMARY OF THE INVENTION

The present invention is a vehicle occupant safety apparatus including a seat for an occupant of a vehicle. The seat includes a seat frame. A length of belt webbing is extensible about the occupant of the seat to restrain the occupant in the seat. A belt webbing engaging member on the seat frame engages the belt webbing and transfers forces from the belt webbing to the seat frame. The seat frame includes means for forming a truss in the seat frame in response to the application of force from the belt webbing to the belt webbing engaging member in excess of a predetermined force. The truss resists deformation due to the forces transmitted to the seat frame.

In a preferred embodiment, the means for forming a truss includes a plurality of interconnected seat frame members. The belt webbing engaging member is mounted on a first one of the seat frame members. The interconnected seat frame members are movable relative to each other to form the truss.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic side illustration of a vehicle occupant restraint system including a vehicle seat with a truss assembly in accordance with the present invention shown in an actuated condition, the vehicle seat being shown in phantom;

FIG. 2 is a schematic frontal illustration of the vehicle seat and restraint system of FIG. 1, the seat being shown in phantom;

FIG. 3 is a side view of the truss assembly in an unactuated condition;

FIG. 4 is a sectional view taken along line 4—4 of FIG. 3;

FIG. 5 is a view similar to FIG. 3 showing the truss assembly in a partially actuated condition;

FIG. 6 is a view similar to FIG. 5 showing the truss assembly in a fully actuated condition;

FIG. 8 is a fragmentary schematic view of a portion of a truss assembly in accordance with a second embodiment of the present invention.

DESCRIPTION OF A PREFERRED EMBODIMENT

Figure 7:
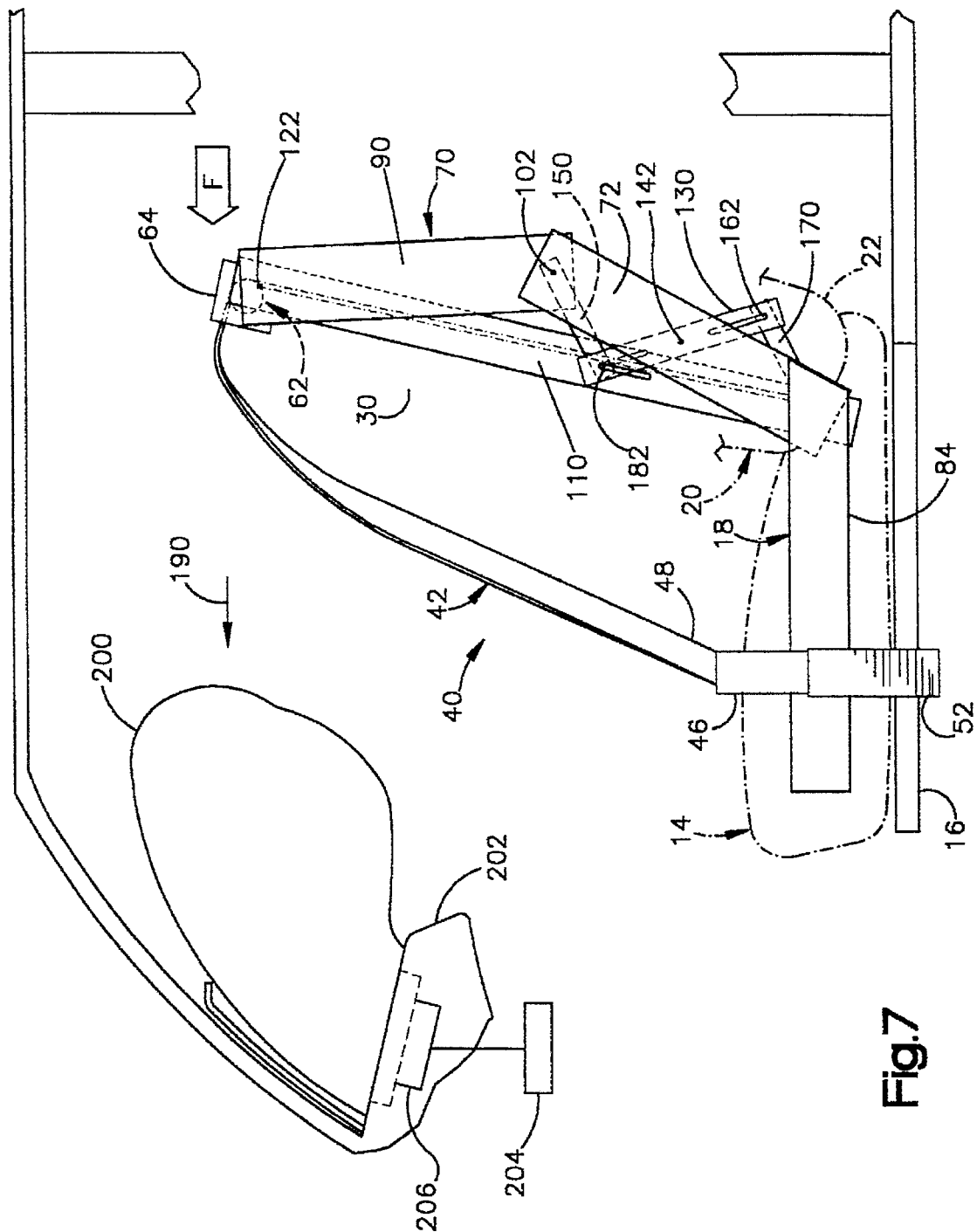
FIG. 7 is a schematic illustration similar to FIG. 2 showing a vehicle occupant restraint system including an inflatable vehicle occupant restraint.

The present invention relates to a vehicle safety apparatus and particularly to a seat integrated vehicle occupant restraint for protecting the occupant of a vehicle seat. The present invention is applicable to various occupant restraint constructions. As representative of the present invention, FIG. 1 illustrates schematically a vehicle occupant restraint system 10.

The occupant restraint system 10 includes a seat 12 for an occupant of a vehicle. The seat 12 includes a seat bottom cushion 14 supported on a portion 16 of the body of the vehicle. The seat also includes a seat frame indicated generally at 18. A seat back 20 (FIG. 2) is connected with the seat bottom cushion 14. The seat back 20 has a lower portion 22 and an upper portion 24 (FIG. 2). The seat back 20 also has an outboard side 26 and an inboard side 28.

The seat back 20 includes a seat cover 30. The seat cover 30 is typically a layer of cloth or leather which covers the structural and supporting components of the seat 12. The seat back cover 30 includes surfaces defining a slot 32 in the seat back 20. The slot 32 extends through the material of the cover 30 at a location adjacent the top portion 24 of the vehicle seat back 20.

The occupant restraint system 10 also includes a three-point continuous loop seat belt system 40 shown in FIGS. 1 and 2. The seat belt system 40 includes a single continuous length of belt webbing 42 which is divided by a movable tongue assembly 44 into a lap portion 46 and a shoulder portion 48. The lap portion 46 extends across the seat bottom cushion 14 and across the lap of an occupant seated in the seat 12. The shoulder portion 48 extends across the seat back 20 and across the torso of an occupant seated in the seat 12. The tongue assembly 44 is shown engaged with a buckle 50 anchored to the vehicle body.

One end of the length of belt webbing 42 is connected at an anchor point 52 to the vehicle body. The anchor point 52 is disposed adjacent a side of the seat 12 opposite the buckle 50. The opposite end of the length of belt webbing 42 extends from a seat belt webbing retractor 60. The retractor 60 (FIGS. 2 and 4) is supported inside the seat bottom cushion 14 on the frame 18 of the seat 12 in a manner not shown.

The length of belt webbing 42 extends upward in the vehicle seat back 20 from the retractor 60 to a belt webbing engaging member 62 disposed in the seat back upper portion 24. The shoulder portion 48 of the belt webbing 42 extends from the belt webbing engaging member 62 out of the slot 32 in the upper portion 24 of the seat back 20 and in a direction toward the buckle 50. In a preferred embodiment, the belt webbing engaging member 62 is a spool, such as the spool of a seat belt retractor, supported on a frame 64. The spool 62 includes at its axial ends a pair of circular radially extending side flanges 66 which are spaced apart and between which the belt webbing 42 extends. The flanges 66 position the belt webbing 42 laterally and thus guide the belt webbing as it exits the vehicle seat back 20. The belt webbing 42, specifically the shoulder portion 48, extends from the spool 62 out of the seat back 20 through the slot 32 in the cover 30. The spool 62 thus functions as a belt guide.

The seat frame 18 includes a truss assembly 70 (FIGS. 3 and 4) for supporting the spool 62. The truss assembly 70 may be of a variety of constructions. The truss assembly 70, as illustrated in the drawings, includes as its major components a fixed link 72, an upper link 90, a support link 110, a rotatable link 130, a lower pivot link 150, and an upper pivot link 170. For clarity, in FIGS. 3, 5 and 6, the fixed link 72 is shown in heavy dot-dash lines, the rotatable link 130 is shown in light dot-dash lines, the lower pivot link 150 is shown in dashed lines, and the upper pivot link 170 is shown in dashed lines. Also, in FIGS. 2 and 4, the links 72, 90, 110, 130, 150 and 170 are shown spaced apart for clarity.

The fixed link 72 is a rectangular metal plate having an inner major side surface 74 (FIG. 4) and an outer major side surface 76. A longitudinal central axis 78 (FIG. 6) of the fixed link 72 extends between a lower end portion 80 and an upper end portion 82 of the fixed link.

The lower end portion 80 of the fixed link 72 is rigidly secured to a seat frame member 84 disposed in the seat bottom cushion 14. The seat frame member 84 is illustrated schematically in the drawings and is part of the seat frame 18. A first pivot pin 86 is fixed on the lower end portion 80 of the fixed link 72. A central portion 88 of the fixed link 72 extends between the lower end portion 80 and the upper end portion 82.

The upper link 90 is a rectangular metal plate having an inner major side surface 92 and an outer major side surface 94. A longitudinal central axis 96 (FIG. 6) of the upper link 90 extends between a lower end portion 98 (FIG. 4) and an upper end portion 100 of the upper link. The lower end portion 98 of the upper link 90 is connected with the upper end portion 82 of the fixed link 72 by a second pivot pin 102. The second pivot pin 102 supports the upper link 90 for pivotal movement relative to the fixed link.

The support link 110 is a rectangular steel plate having an inner major side surface 112 and an outer major side surface 114. A longitudinal central axis 116 (FIGS. 3 and 6) of the support link 110 extends between an upper end portion 118 (FIGS. 3 and 4) and a lower end portion 120 of the support link. The upper end portion 118 of the support link 110 is connected with the upper end portion 100 of the upper link 90 by a third pivot pin 122. The third pivot pin 122 interconnects the upper link 90 and the support link 110 for pivotal movement relative to each other. The frame 64 of the belt webbing engaging member 62 (FIG. 2) is rigidly connected to the upper end portion 118 of the support link 110.

The lower end portion 120 of the support link 110 includes surfaces defining a lower slot 124 in the support link. The lower slot 124 is disposed on and extends in a direction parallel to the longitudinal central axis 116 of the support link 110. The first pivot pin 86 on the lower end portion 80 of the fixed link 72 extends through the lower slot 124 in the support link 110. The support link 110 also includes surfaces defining a central slot 126. The central slot 126 is disposed on and extends in a direction parallel to the longitudinal central axis 116 of the support link 110.

The rotatable link 130 is a rectangular metal plate having an inner major side surface 132 and an outer major side surface 134 (FIG. 4). A longitudinal central axis 136 (FIG. 6) of the rotatable link 130 extends between an upper end portion 138 and a lower end portion 140 of the rotatable link.

A fourth pivot pin 142 (FIGS. 3 and 4) on the fixed link 72 supports the rotatable link 130 for rotation relative to the fourth pivot pin 142 and the fixed link. The fourth pivot pin 142 is disposed equidistant between the ends of the rotatable link 130. The rotatable link 130 is symmetrical about the fourth pivot pin 142. The upper end portion 138 of the rotatable link 130 includes an upper slot 144 which at least partially overlaps the central slot 126 in the support link 110. The lower end portion 140 of the rotatable link 130 includes a lower slot 146.

The lower pivot link 150 is a rectangular metal plate having an inner major side surface 152 and an outer major side surface 154. A longitudinal central axis 156 (FIG. 6) of the lower pivot link 150 extends between an upper end portion 158 (FIGS. 3 and 4) and a lower end portion 160 of the lower pivot link. The lower end portion 160 of the lower pivot link 150 is supported on the first pivot pin 86 for pivotal movement about the first pivot pin relative to the fixed link 72. The lower pivot link 150 is thus supported for pivotal movement relative to the support link 110.

A fifth pivot pin 162 is fixed to the upper end portion 158 of the lower pivot link 150. The fifth pivot pin 162 extends through the lower slot 146 of the rotatable link 130. The fifth pivot pin 162 connects the rotatable link 130 and the lower pivot link 150 for movement relative to each other.

The upper pivot link 170 is identical to the lower pivot link 150. The upper pivot link 170 is a rectangular metal plate having an inner major side surface 172 and an outer major side surface 174. A longitudinal central axis 176 (FIG. 6) of the upper pivot link 170 extends between an upper end portion 178 (FIGS. 3 and 4) and a lower end portion 180 of the upper pivot link. The upper end portion 178 of the upper pivot link 170 is supported on the second pivot pin 102 for pivotal movement about the second pivot pin relative to the fixed link 72. The upper pivot link 170 is thus also supported for pivotal movement relative to the upper link 90.

A sixth pivot pin 182 is fixed to the lower end portion 180 of the upper pivot link 170. The sixth pivot pin 182 extends through the upper slot 144 of the rotatable link 130 and also through the intermediate slot 126 of the support link 110. The sixth pivot pin 182 connects the support link 110, the rotatable link 130, and the upper pivot link 170 for movement relative to each other.

FIGS. 3 and 4 illustrate the parts of the truss assembly 70 in an unactuated position. In this position, the links 72, 90, 110, 130, 150 and 170 extend parallel to each other, as seen in FIG. 3. The longitudinal central axes of the links of the truss assembly 70 are parallel and co-linear as viewed in FIG. 3. Specifically, the axis 78 of the fixed link 72, the axis 96 of the upper link 90, the axis 116 of the support link 110, the axis 136 of the rotatable link 130, the axis 156 of the lower pivot link 150, and the axis 176 of the upper pivot link 170 all are parallel and co-linear as viewed in FIG. 3.

When the truss assembly 70 is in the unactuated position shown in FIGS. 3 and 4, the sixth pivot pin 182 on the lower end portion 180 of the upper pivot link 170 is disposed at the lower end of the intermediate slot 126 on the support link 110. The sixth pivot pin 182 is also disposed at the lower end of the upper slot 144 on the rotatable link 130. The fifth pivot pin 162 on the upper end portion 158 of the lower pivot link 150 is disposed at the upper end of the lower slot 146 on the rotatable link 130. The first pivot pin 86 on the lower end portion 80 of the fixed link 72 is disposed at the lower end of the lower slot 124 in the support link 110.

In the event of sudden vehicle deceleration such as occurs in a vehicle collision, the vehicle occupant initially continues moving forward relative to the seat back 20. The forward moving vehicle occupant engages the shoulder portion 48 of the belt webbing 42. The force F (FIGS. 1 and 5) of the forward moving vehicle occupant is transferred to the shoulder portion 48 of the belt webbing 42 and thence to the belt webbing engaging member 62.

The force F acts in the direction indicated by the arrow 190 (FIGS. 1 and 5) on the belt webbing engaging member 62. Because the belt webbing engaging member 62 (FIGS. 1 and 2) is rigidly connected with the support link 110 by the frame 64, the force on the belt webbing engaging member 62 is transferred undiminished to the upper end portion 118 of the support link.

If the force F exceeds a predetermined force, the support link 110 moves relative to the seat frame member 84 and the fixed link 72 under the influence of the force F. The support link 110 pivots about the first pivot pin 86 and the upper end portion 118 of the support link moves forward, in the direction indicated by the arrow 190. The support link 110 moves from the unactuated position shown in FIG. 3 through the intermediate position shown in FIG. 5 to the actuated position shown in FIG. 6.

While the support link 110 is pivoting forward, the upper link 90 simultaneously pivots about the second pivot pin 102 relative to the fixed link 72. The upper link 90 moves from the unactuated position shown in FIG. 3 through the intermediate position shown in FIG. 5 to the actuated position shown in FIG. 6.

During the movement of the support link 110 and the upper link 90 to the actuated position shown in FIG. 6, the support link slides downward. That is, the lower end portion 120 of the support link 110, including the lower slot 124, moves relative to the first pivot pin 86 from a position (FIG. 3) in which the first pivot pin is disposed at the lower end of the lower slot 124 to a position (FIG. 6) in which the first pivot pin is disposed at the upper end of the lower slot 124. The engagement of the first pivot pin 86 with the support link 110 at the upper end of the lower slot 124 blocks further downward movement of the support link.

While the support link 110 and the upper link 90 are moving to the positions shown in FIG. 6, the remaining links 130, 150 and 170 of the truss assembly 70 are also, simultaneously, moving to the positions shown in FIG. 6. The movement of the support link 110 results in forward and downward movement of the intermediate slot 126 in the support link. The forward movement of the surfaces which define the intermediate slot 126 in the support link 110 causes a forwardly-directed force to be exerted on the sixth pivot pin 182 which is received in the intermediate slot. The forwardly-directed force on the sixth pivot pin 182 causes the lower end portion 180 (FIG. 4) of the upper pivot link 170 to swing forward and upward. The upper pivot link 170 pivots about the second pivot pin 102 in a clockwise direction as viewed in FIGS. 4–6. The relative movement of the intermediate slot 126 in the support link 110 and the sixth pivot pin 182 on the upper pivot link 170 terminates when the sixth pivot pin is disposed at the upper end of the intermediate slot 126.

The rotatable link 130 pivots in a counter-clockwise direction as viewed in FIGS. 4–6. The upper end portion 138 of the rotatable link 130, including the upper slot 144, moves relative to the sixth pivot pin 182 to a position (FIG. 6) in which the sixth pivot pin is disposed at the upper end of the upper slot 144. The relative movement of the intermediate slot 126 in the support link 110 and the sixth pivot pin 182 on the upper pivot link 170, and the relative movement of the upper slot 144 in the rotatable link 130 and the sixth pivot pin on the upper pivot link, terminate when the sixth pivot pin 182 engages (a) the support link at the upper end of the intermediate slot and (b) the rotatable link at the upper end of the upper slot 144 in the rotatable link.

The counterclockwise rotation of the rotatable link 130 causes the fifth pivot pin 162 on the lower pivot link 150 to move along the lower slot 146 in the rotatable link. The lower end portion 140 of the rotatable link 130, including the lower slot 146, and the fifth pivot pin 162 on the lower pivot link 150 move relative to each other to a position (FIG. 6) in which the fifth pivot pin is disposed at the lower end of the lower slot 146. The relative movement of the rotatable link 130 including the lower slot 146, and the fifth pivot pin 162 on the lower pivot link 150, terminates when the fifth pivot pin engages the rotatable link at the lower end of the lower slot 146 in the rotatable link.

When the parts of the truss assembly 70 are thus in the position shown in FIG. 6, a first rigid triangular portion of the truss assembly is formed by the support link 110, the upper link 90, and the fixed link 72. This first triangular portion of the truss assembly 70 structure has as its apices the pivot pins 86, 102 and 122. A second rigid triangular portion of the truss assembly 70 is formed by the upper pivot link 170, the upper link 90, and the portion of the support link 110 extending between the belt webbing engaging member 62 and the intermediate slot 126. This second triangular portion of the truss assembly 70 has as its apices the pivot pins 102, 122 and 182.

A third rigid triangular portion of the truss assembly 70 is formed by the upper pivot link 170, the portion of the rotatable link 130 extending between the upper slot 144 and the fourth pivot pin 142, and the portion of the fixed link 72 between the fourth pivot pin and the second pivot pin 102. This third triangular portion of the truss assembly 70 has as its apices the pivot pins 102, 142 and 182. A fourth rigid triangular portion of the truss assembly 70 is formed by the lower pivot link 150, the portion of the rotatable link 130 extending between the lower slot 146 and the fourth pivot pin 142, and the portion of the fixed link 72 between the first pivot pin 86 and the fourth pivot pin 142. This fourth triangular portion of the truss assembly 70 has as its apices the pivot pins 86, 142 and 162.

When the parts of the truss assembly 70 are in the position shown in FIG. 6, and force is exerted in the direction 190 on the upper end portion 118 of the support link 110, the support link goes into compression along its longitudinal central axis 116 between the belt webbing engaging member 62 and the first pivot pin 86. It is possible that some portions of the support link 110 may go into tension if the support link experiences, for example, a bending moment. The upper link 90 and the fixed link 72 go into tension along their respective longitudinal central axes 96 and 78. The upper pivot link 170 and the lower pivot link 150 go into tension along their respective longitudinal central axes 176 and 156. The rotatable link 130 goes into tension along its longitudinal central axis 136. The truss assembly 70, when in the actuated condition, resists forward movement of the upper end portion 118 of the support link 110. Thus, the truss assembly 70 resists forward movement of the belt webbing engaging member 62. The parts of the truss assembly 70 including the links 72, 90, 110, 130, 150 and 170 are just strong enough so that they do not bend when loaded as shown in FIG. 6 by the force F. The truss assembly 70 as a whole is lighter than a corresponding single beam which would substitute for the truss assembly, which beam is just strong enough so that it does not bend when loaded by the same force F.

FIG. 7 illustrates the use of the truss assembly 70 in conjunction with an inflatable vehicle occupant restraint or air bag 200. The air bag 200 is shown in FIG. 7 in a partially inflated condition. The air bag 200 is mounted in a vehicle instrument panel 202 connected with the vehicle body portion 16. The instrument panel 202 is disposed forward (to the left in FIG. 7 as indicated by the arrow 190) of the vehicle seat 12. Associated with the air bag 200 are sensing means 204 for sensing vehicle deceleration in excess of a predetermined magnitude and inflator means 206 for inflating the air bag in response to sensing vehicle deceleration in excess of the predetermined magnitude. The predetermined magnitude of vehicle deceleration is preferably selected to be a magnitude which is experienced when the vehicle occupant moves forward relative to the seat 12 so as to apply force to the belt webbing 42, and thereby to the belt webbing engaging member 62, sufficient to result in movement of the truss assembly 70 from the unactuated condition to the actuated condition.

In the event of vehicle deceleration in excess of the predetermined magnitude, the sensing means 204 cooperates with the inflator means 206 to cause the air bag 200 to inflate into a position to restrain an occupant of the vehicle seat 12. At about the same time, the vehicle occupant moves forward relative to the seat 12 and applies force to the belt webbing 42, and thereby to the belt webbing engaging member 62, sufficient to result in movement of the truss assembly 70 from the unactuated condition to the actuated condition.

Each one of the slots 124, 126, 144 and 146 is illustrated as having a uniform width (as measured from left to right as seen in FIG. 3) and a rounded end for receiving its respective pivot pin. One or all of the slots 124, 126, 144 and 146 could be made narrower at the end to reduce shock loading. As an example, FIG. 8 illustrates a portion of a truss assembly 70a in an unactuated condition and including wall portions defining a slot 124a for receiving a pivot pin 86a. The slot 124a has a major portion 125a of uniform width, just large enough to accommodate the width of the pivot pin 86a. The end portion 127a of the slot 124a tapers to a width which is narrower than the width of the major portion 125a. When the truss assembly 70a moves to an actuated condition and the pivot pin 86a moves (not shown) to the upper (as viewed in FIG. 8) end of the slot 124a, the pivot pin engages the wall portions defining the slot portion 127a. The material of the wall portions deforms, absorbing some of the force of the moving pivot pin 86a, prior to the pivot pin reaching the end of the slot 124a. This material deformation can restrain the movement of the truss assembly 70a into the actuated condition, reducing the shock load on the vehicle occupant.

The truss assembly 70 illustrated in FIGS. 1–7 provides about three inches of forward movement of the belt webbing engaging member 62 between the unactuated condition and the actuated condition. Different amounts of movement are possible. Also, a spring mechanism (not shown) can be provided for initially resisting movement of the truss assembly 70 from the unactuated position to the actuated position and for returning the truss assembly to the unactuated position. Alternatively, a shear pin (not shown) can be provided for initially resisting movement of the truss assembly 70 from the unactuated position to the actuated position. Further, a different belt webbing engaging member, such as a seat belt webbing retractor, could be mounted on the support link of the truss assembly.

It should be understood that the illustrated embodiment is only one possible construction of a truss assembly in accordance with the present invention. Depending on the seat configuration and its mounting, and depending on the placement and mounting of the belt webbing engaging member within the seat, the truss assembly may be installed or oriented in a different configuration. Different numbers of links or different configurations of links can be provided.

From the above description of the invention, those skilled in the art will perceive improvements, changes and modifications in the invention. For example, the truss assembly 70 may include energy absorption means (not shown) for absorbing some of the kinetic energy of the forward moving vehicle occupant. Thus, one of more of the links of the truss assembly may be deformable, such as at a predetermined weakened location, to enable controlled restrained forward movement of the vehicle occupant in the event of a vehicle collision. Alternatively, a known energy management device such as a shock absorber can be incorporated in the truss assembly 70 to selectively resist or slow relative movement of the links of the truss assembly. Such improvements, changes and modifications within the skill of the art are intended to be covered by the appended claims.

Having described the invention, I claim:

1. A vehicle occupant safety apparatus comprising:

a seat for an occupant of a vehicle, said seat including a seat frame;

a length of belt webbing extensible about the vehicle occupant to restrain the vehicle occupant in said seat; and a belt webbing engaging member mounted on said seat frame and engaging said belt webbing for transferring forces from said belt webbing to said seat frame;

said seat frame including means for resisting deformation of said seat frame due to the forces transmitted to said seat frame;

said means for resisting deformation comprising a plurality of interconnected seat frame members which are movable relative to each other from an unactuated position to an actuated position in response to the application of force from said belt webbing to said belt webbing engaging member, a first one of said seat frame members going into compression when moved and at least a second one of said seat frame members going into tension when moved, said plurality of seat frame members remaining unbent when moved.

2. A vehicle safety apparatus as set forth in claim 1 comprising means for fixing said belt webbing engaging member on said first seat frame member for movement with said first seat frame member.

3. A vehicle safety apparatus as set forth in claim 1 wherein said belt webbing engaging member comprises a spool having flanges for guiding said length of belt webbing over said spool.

4. A vehicle safety apparatus as set forth in claim 1 wherein said seat frame members comprise metal plates and said means for resisting deformation includes a plurality of pivot pins interconnecting said metal plates for relative movement.

5. A vehicle safety apparatus as set forth in claim 1 further comprising:

an inflatable vehicle occupant restraint inflatable to restrain the vehicle occupant;

sensing means for sensing vehicle deceleration in excess of a predetermined deceleration; and means for inflating said inflatable vehicle occupant restraint in response to sensing vehicle deceleration in excess of said predetermined deceleration.

6. A vehicle occupant safety apparatus comprising:

a seat for an occupant of a vehicle, said seat including a seat frame;

a length of belt webbing extensible about the vehicle occupant to restrain the vehicle occupant in the seat; and a belt webbing engaging member mounted on said seat frame and engaging said belt webbing for transferring forces from said belt webbing to said seat frame;

said seat frame including means for forming a truss in said seat frame, in response to the application of force from said belt webbing to said belt webbing engaging member in excess of a predetermined force, to resist deformation of said seat frame due to the forces transmitted to said seat frame;

wherein said means for forming a truss comprises a plurality of interconnected seat frame members, said belt webbing engaging member being mounted on a first one of said plurality of interconnected seat frame members, said plurality of interconnected seat frame members being movable relative to each other from an unactuated condition to an actuated condition to form said truss; and wherein said plurality of interconnected seat frame members includes a second seat frame member and a third seat frame member each having first and second end portions, said first and second and third seat frame members having parallel axes when in the unactuated condition and forming a triangular portion of said truss when in the actuated condition.

7. A vehicle occupant safety apparatus as set forth in claim 6 further including means for connecting said lower end portion of said first seat frame member with said second seat frame member for sliding movement relative to said second seat frame member in response to the application of force from said belt webbing on said belt webbing engaging member in excess of the predetermined force.

8. A vehicle occupant safety apparatus as set forth in claim 7 further including means for rigidly connecting said second seat frame member with a portion of said seat frame to block movement of said second seat frame member upon relative movement of said plurality of interconnected seat frame members to the actuated condition.

9. A vehicle occupant safety apparatus as set forth in claim 6 wherein said first seat frame member goes into compression upon movement of said plurality of interconnected seat frame members into the actuated condition, said second and third seat frame members going into tension upon movement of said plurality of interconnected seat frame members into the actuated condition.

10. A vehicle safety apparatus as set forth in claim 6 wherein said plurality of interconnected seat frame members includes a fixed second seat frame member and movable third, fourth, fifth and sixth seat frame members, said first, third, fourth, fifth and sixth seat frame members being supported on said fixed second seat frame member for relative movement in response to the application of force on said belt webbing engaging member in excess of the predetermined force.

11. A vehicle occupant safety apparatus comprising:

a seat for an occupant of a vehicle, said seat including a seat frame;

a length of belt webbing extensible about the vehicle occupant to restrain the vehicle occupant in the seat; and a belt webbing engaging member mounted on said seat frame and engaging said belt webbing for transferring forces from said belt webbing to said seat frame;

said seat frame including means for forming a truss in said seat frame, in response to the application of force from said belt webbing to said belt webbing engaging member in excess of a predetermined force, to resist deformation of said seat frame due to the forces transmitted to said seat frame;

wherein said means for forming a truss comprises a plurality of interconnected seat frame members, said belt webbing engaging member being mounted on a first one of said plurality of interconnected seat frame members, said plurality of interconnected seat frame members being movable relative to each other from an unactuated condition to an actuated condition to form said truss; and wherein said first seat frame member includes (a) an upper end portion on which said belt webbing engaging member is mounted and (b) an opposite lower end portion movably connected with a fixed portion of said seat frame, said lower end portion of said first seat frame member having surfaces defining a slot in said first seat frame member, said fixed portion of said seat frame including a pin extending into said slot and supporting said first seat frame member for movement relative to said pin, said first seat frame member being slidable on said pin with said slot moving relative to said pin in response to the application of force from said belt webbing on said belt webbing engaging member in excess of the predetermined force.

12. A vehicle occupant safety apparatus comprising:

a seat for an occupant of a vehicle, said seat including a seat frame;

a length of belt webbing extensible about the vehicle occupant to restrain the vehicle occupant in the seat; and a belt webbing engaging member mounted on said seat frame and engaging said belt webbing for transferring forces from said belt webbing to said seat frame;

said seat frame including means for forming a truss in said seat frame, in response to the application of force from said belt webbing to said belt webbing engaging member in excess of a predetermined force, to resist deformation of said seat frame due to the forces transmitted to said seat frame;

wherein said means for forming a truss comprises a plurality of interconnected seat frame members, said belt webbing engaging member being mounted on a first one of said plurality of interconnected seat frame members, said plurality of interconnected seat frame members being movable relative to each other from an unactuated condition to an actuated condition to form said truss;

wherein said plurality of interconnected seat frame members support said belt webbing engaging member for forward movement in the vehicle seat in response to the application of force on said belt webbing engaging member in excess of the predetermined force, said means for forming a truss including blocking means for limiting forward movement of said belt webbing engaging member; and wherein said blocking means comprises a pin on one of said plurality of interconnected seat frame members and wall portions defining a slot in another one of said plurality of interconnected seat frame members, said pin extending into said slot and being movable in said slot, in response to the application of force from said belt webbing on said belt webbing engaging member in excess of the predetermined force, into engagement with one of said wall portions to block further movement of said pin.

13. A vehicle occupant safety apparatus as set forth in claim 12 wherein said wall portions define a tapered end portion of said slot, said pin engaging and deforming the material of said wall portions, said truss assembly thereby absorbing some of the force from said belt webbing on said belt webbing engaging member to reduce the shock load on the vehicle occupant.

14. A vehicle occupant safety apparatus comprising:

a seat for an occupant of a vehicle, said seat including a seat frame;

a length of belt webbing extensible about the vehicle occupant to restrain the vehicle occupant in said seat; and a belt webbing engaging member mounted on said seat frame and engaging said belt webbing for transferring forces from said belt webbing to said seat frame;

said seat frame including means for resisting deformation of said seat frame due to the forces transmitted to said seat frame;

said means for resisting deformation comprising a plurality of interconnected seat frame members which are movable relative to each other in response to the application of force from said belt webbing to said belt webbing engaging member, a first one of said seat frame members going into compression when moved and at least a second one of said seat frame members going into tension when moved, said plurality of seat frame members remaining unbent when moved;

wherein said means for resisting deformation comprises means for supporting said plurality of interconnected seat frame members in an actuated position in which said plurality of interconnected seat frame members form a plurality of rigid triangular structures in response to the application of force from said belt webbing to said belt webbing engaging member in excess of a predetermined force.

\* \* \* \* \*